Figure 1:
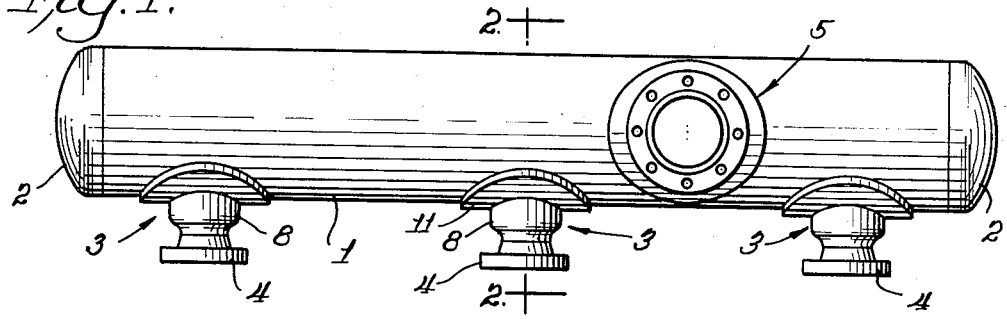

March 24, 1964  E. J. HALTER  3,126,032
NONREACTIVE CONNECTION FOR PULSATION ABSORBER
Filed Nov. 14, 1963

INVENTOR.
Edmund J. Halter
BY
Darbo, Robertson & Vandenburgh
att'ys.

United States Patent Office 3,126,032
Patented Mar. 24, 1964

3,126,032
NONREACTIVE CONNECTION FOR PULSATION ABSORBER
Edmund J. Halter, Irving, Tex., assignor to Burgess-Manning Company, Dallas, Tex., a corporation of Illinois
Filed Oct. 14, 1963, Ser. No. 315,965
2 Claims. (Cl. 138—26)

This invention relates to devices for absorbing or damping the pulsations in pulsating flowing gases, such as the intake or discharge of a reciprocating compressor. More pariticularly, the invention is directed to improved means for connecting pulsation absorbers with apparatus such as reciprocating compressors which tend to generate the pulsations in the flowing gas stream.

Various types of apparatus have been devised and are in use for the purpose of attenuating the pulsations in gases flowing, for example, from a reciprocating compressor, the pulsations being caused by the intermittent introduction of the gas into the piping system from the discharge valves of the compressor. Attenuation of such pulsations is desirable to prevent damaging vibration of the piping system, noise, erroneous meter readings, interference with gases being discharged from the compressor cylinders and other undesirable consequences of pulsating flow. In general, pulsation absorbers, or snubbers or pulsation dampeners, as such apparatus is sometimes called, comprise means forming chambers which may contain impedance or other flow modifying structures which operate to smooth the flow of the gases and conduct the same to the piping system.

For optimum performance, and especially for maximum value to the efficiency of the compressor or other apparatus to which the pulsation absorbers are connected, it is desirable that the functioning pulsation absorbing structure be connected as close as possible to the compressor ports and thus to the compressor valves which, of course, are located at the cylinder ports. Due to the relatively large size of the pulsation absorber units and because of the necessity of providing access to the compressor valves, the pulsation absorber units, themselves, must necessarily be spaced an appreciable distance from the compressor and connection made by means of piping. Although relatively short, the pipe connections between the compressor ports and the pulsation absorber permit or cause undesirable build-up and reflection of pulsations. In addition to vibrations in these pipes at natural resonant frequencies and harmonics thereof excited by the pulsations, the sudden change in cross section of the connecting pipe as it opens into the interior of the pulsation absorber chamber causes reflection of pulsations back toward the compressor.

The primary object of the invention is to eliminate, or at least minimize, these undesirable vibrational consequences of the conventionally used connecting pipes between the compressor and like apparatus and the pulsation absorbers. A related object is to enhance the operation of the pulsation absorber by providing means for acting on the pulsating gases immediately beyond the compressor ports, that is, between the compressor and the pulsation absorber.

Figure 2:
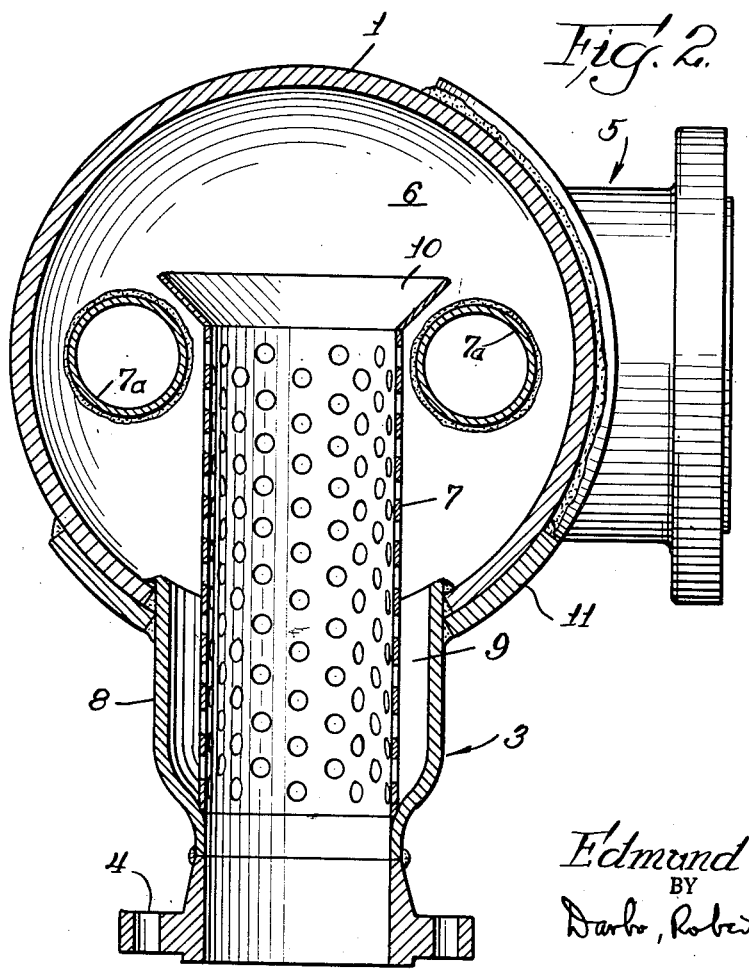

The invention is described in greater detail in conjunction with the accompanying drawings wherein:

FIG. 1 is a side view of a pulsation absorber having three compressor connections, each embodying the invention, and FIG. 2 is a cross-sectional view taken at the line 2—2 of FIG. 1.

In the interest of clarity, the acoustically nonreactive pulsation absorber connection will be described as applicable to a pulsation absorber unit arranged to receive the pulsating discharge from a three cylinder reciprocating compressor.

A typical pulsation absorber unit is illustrated in FIG. 1. A cylindrical shell 1 is closed at both ends by end headers 2. Three intake connections 3 are provided in the cylindrical shell of the unit to make connection by means of flanges 4 with the three discharge ports of a compressor. A single pulsation aborber outlet connection 5 is provided for connection of the absorber unit with the downstream piping system. Thus, the pulsation absorber is interposed between the discharge of the compressor and the piping system into which the compressed gases are conducted for such use as may be made of them.

The internal construction of the pulsation absorber unit is not shown in detail since it is well known and forms no part of the invention herein described and claimed. It may be stated that the pulsation absorber unit is divided into three snubbing sections by means of transverse headers such as header 6 shown in FIG. 2. Perforated snubber impedance tubes 7a pass through the header and provide for the conduction of the gases to the absorber outlet 5.

The invention herein is specifically directed to the construction of connections 3 of the absorber with the compressor or other pulsation-generating apparatus. As is shown in detail in FIG. 2, conduit means are provided for conduction of the gases entering the connectors at flanges 4 into the interior of the absorber without reduction of the cross-sectional area of the conduit. This conduit comprises an internal perforated tube 7 and a concentric outer pipe 8 which is larger in diameter than the perforated tube to provide an expansion space 9 between the perforated tube 7 and the outer pipe 8. Tube 7 is substantially an extension of the opening in flange 4 and is perforated throughout its length for reasons hereinafter explained. The inner end of this tube may be flared, as at 10, if desired, but this is not essential.

Pipe 8 is heavy gauge and is securely welded to the shell 1 of the pulsation absorber unit, a collar 11 being supplied for additional strength inasmuch as the intake (in the case of a discharge snubber) connections 3 also serve to support the pulsation absorber when it has been mounted upon the compressor. In the particular embodiment of the invention illustrated in the drawing, the pipe section 8 is in the form of a swage nozzle having a uniform diameter throughout the part of its length adjacent the pulsation absorber and necked down at the end welded to flange 4 to match the internal diameter of the opening through the flange. This provides an increasing diameter with a resulting chamber 9 which opens into the interior of the pulsation absorber.

For the purposes of the invention, it is important that the expansion space 9 with its perforated interior wall be brought as close as is mechanically possible to the connecting flange 4 and thus to the compressor cylinder. Otherwise stated, it is desirable to minimize the length of the passageway from the compressor to the perforated tube 7 since this passageway, if of substantial length, acts acoustically as an open ended tube with undesirable acoustical and vibrational influence as above described. The perforated tube 7, on the contrary, is an acoustically nonreactive element since the gases are not fully confined therein as they flow through this tube into the pulsation absorber. In addition to the avoidance of the undesirable acoustical reactance of a solid connector tube, the combination of perforated tube and surrounding chamber 9 which opens into the interior of the pulsation absorbing unit positively contributes to the damping of the pulations by permitting preliminary expansion of the gasses as they pass through the intake connectors. Thus, by means of the invention, the disadvantages of the pulsation absorber intake connector elements heretofore employed have been eliminated and useful pulsation absorbing elements have been substituted in their stead.

While the dimensions of the elements of the pulsation absorber connecting structure are not closely critical, satisfactory results depend upon the acoustic and impedance effect of perforated tube 7 and the provision of adequate space 9. As a specific example of a satisfactory structure for a typical application, the inner tube 7 is 12 inches in diameter and 2 feet, 6 inches long and is uniformly perforated with 43 one inch diameter holes. The diameter of the swage nozzle 8 is 18 inches, reduced to 12 inches at the connection end.

While the essential concepts of the invention have been disclosed and described by means of the specific embodiment shown in the drawing, it will be understood that specifically different structural designs may be employed without departing from the principles of the invention as defined by the appended claims.

Invention is claimed as follows:

1. Means for connecting a pulsation absorber with a port of a pulsation-generating apparatus such as a reciprocating compresser, comprising an outer pipe (8) having a reduced diameter at one end thereof and being rigidly fastened to and opening into the interior of the pulsation absorber at the other end thereof, a perforated inner tube (7) having substantially the same diameter as the reduced diameter of said outer pipe and extending through said pipe coaxially therewith and into the interior of the pulsation absorber, said inner tube and outer pipe defining an expansion space (9) therebetween, and means adapted to proximately connect the reduced end of said pipe with a port of a pulsation-generating apparatus.

2. Structure in accordance with claim 1 wherein the outer pipe is a swage nozzle the diameter of which increases relatively gradually from that at the reduced end to a diameter which obtains throughout the greater part of the length of the pipe.

References Cited in the file of this patent

UNITED STATES PATENTS

| | | |
|---|---|---|
| 696,277 | Sponseller et al. | Mar. 25, 1902 |
| 2,501,794 | Stephens | Mar. 28, 1950 |
| 2,962,110 | Depman | Nov. 29, 1960 |